Nov. 25, 1958  A. J. PADAVANO  2,861,485
WORKHOLDER AND HOLE LOCATER
Filed May 24, 1957
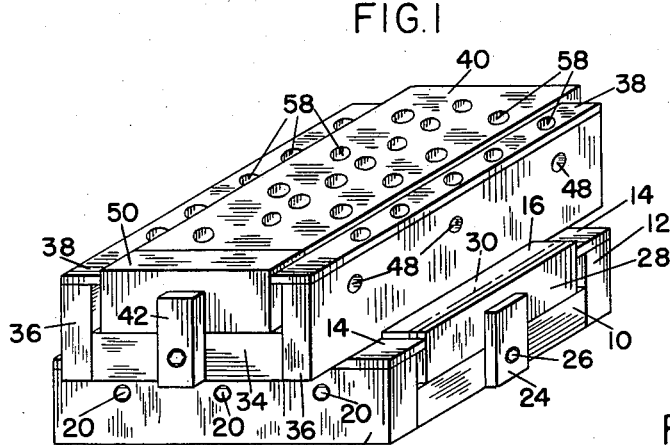
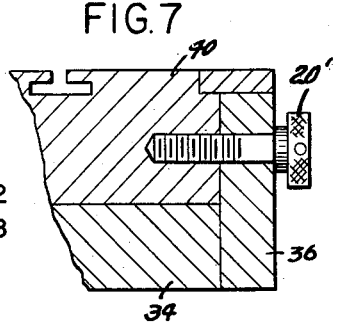
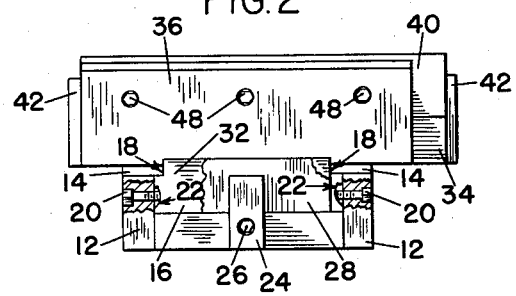
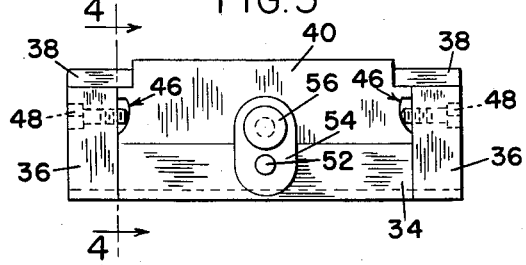
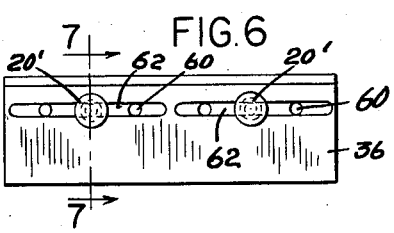
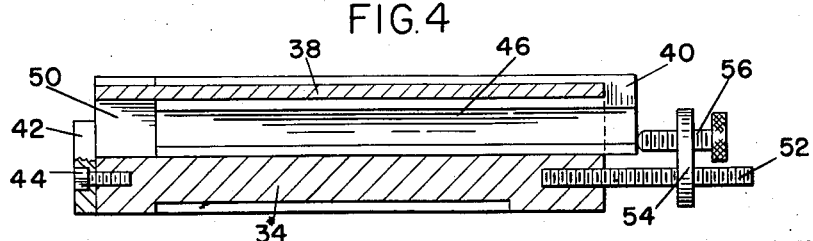
INVENTOR.
ANTHONY J. PADAVANO
BY
ATTORNEY

United States Patent Office 2,861,485
Patented Nov. 25, 1958

2,861,485

WORKHOLDER AND HOLE LOCATER

Anthony J. Padavano, Worcester, Mass.

Application May 24, 1957, Serial No. 661,468

5 Claims. (Cl. 77—63)

This invention relates to a new and improved workholder, jig, or hole locater, and the principal object of the invention resides in the provision of an extremely accurately adjustable device for locating a piece of work with respect to a machine tool such as for instance in a drill press.

Other objects of the invention include the provision of a device of the class described including a sub-base having an adjustable plate thereon and means to constrain the adjustment of the plate rectilinearly, in combination with a second base fixed with relation to the plate and itself having a rectilinearly adjustable plate thereon, in combination with anvils or the like on each of the bases, said anvils determining the location of the respective plate, with respect to its own base by the use of a selection of very accurate gauge blocks inserted between a respective plate and its anvil, and including means to clamp each plate to its base in spaced relation to the anvil by the amount of the gauge block which is used, it being understood that many gauge blocks of different thicknesses are available for correctly positioning the workpiece in this manner.

Other objects and advantages of the invention will appear hereinafter.

Reference is to be had to the accompanying drawings, in which

Fig. 1 is a perspective view illustrating the invention;

Fig. 2 is a view in end elevation thereof;

Fig. 3 is a view in end elevation of the upper base and plate showing a modification;

Fig. 4 is a section on line 4—4 of Fig. 3;

Fig. 5 is an end view of a modification;

Fig. 6 is a side view of a modification; and

Fig. 7 is an enlarged section on line 7—7 of Fig. 6.

This invention may be used for grinding, inspection, locating surfaces as well as holes, drilling, boring, and in fact in any relationship in which it may be found to be useful. However, one of the most common usages for this device is found in drilling holes in a workpiece.

The invention comprises a sub-base 10 to which are attached by any desired means or made integral therewith a pair of spaced uprights 12, 12 at either side thereof, and on each upright there is a guiding member 14, 14 to hold down while slidably guiding a sub-plate indicated at 16. This sub-plate is preferably recessed at 18 forming shoulders complementing the guide-plates 14.

The sub-plate 16 being slidable on base 10 and between side members 12, may be clamped in adjusted position by a series of setscrews 20 in the side plates 12 and engaging at their inner ends slanted surface grooves 22 in the side faces of the sub-plate 16.

The sub-plate 16 is normally located accurately with respect to its base by means of an anvil 24 removably held to sub-base 10 by means of a setscrew or the like 26. There may be one of these anvils at either end of plate 10 and when it is desired to adjust sub-plate 16 on sub-base 10, the appropriate anvil 24 is removed, the sub-plate 16 moved where desired and then clamped.

In order to determine the exact desired location of sub-plate 16 with respect to sub-base 10, a very accurately ground gauge block such as for instance illustrated at 28 may be utilized to space sub-plate 16 with respect to the end of sub-base 10 as is perhaps best shown in Fig. 1. The broken line at 30 indicates the usage of a different thickness of gauge block for the same purpose or a combination of two gauge blocks in order to accomplish a certain desired adjustment.

Centrally thereof, sub-plate 16 rises slightly above guide-plate 14 as indicated at 32 and forms a fixed connection with a second or upper base 34 located at 90° to sub-base 10. Base 34 also has side plates as at 36 similar to those at 12, together with guiding plates 38 similar to those at 14. Since the sub-plate 16 is fixed with respect to base 34, when sub-base 16 is adjustably moved as above described, it carries with it the base 34.

Base 34 slidably mounts the upper plate 40 which is similar to that at 16 and may move at right angles to plate 16. Base 34 is provided with anvils 42 held by setscrews 44 similar to anvil 24. The side faces of the upper sliding plate 40 are indented as at 46 similarly to the grooves at 22 and setscrews at 48 clamp the sliding plate 40 in desired position as above described with respect to sub-plate 16.

As shown in Fig. 1, a guage block 50 is utilized to space sliding plate 40 with respect to anvil 42 in the same manner that sub-plate 16 was adjustably located by the gauge block 28, and thus it will be seen that an extremely accurate location of a piece of work mounted on plate 40 is possible.

When an anvil 24 or 42 is removed in order to provide an adjustment as above stated, a screw 52 may be substituted for the respective setscrew as is clearly indicated in Figs. 3 and 4. On this screw 52, there may be mounted a strap 54 carrying a locating hand-operated screw 56 which is used as an abutment so that the respective plates 16 or 40 may be properly located. The screw and strap described are not necessary but may be preferred to be used upon occasion, and they may be dispensed with because the gauge-block of course determines the degree of adjustment and the plates are held manually against the respective gauge block while the setscrews on the sides as at 20 or 48 are adjusted to clamp the plate in desired position.

Proper counter-bored holes may be provided in the bases 10 and 34 in order to mount the same in desired position, and if desired there may be a V-block, special or standard, secured to the sliding plate 40 so as to drill, bore or grind holes, slots, etc. The sliding plate 40 may be provided with an appropriate number of properly located holes as at 58 for the purpose of providing means for holding the work in position and other changes and combinations of parts may be made without departing from the scope of the invention.

In Fig. 5 the construction is substantially the same but a smaller gauge block as at 50′ is shown as being used as well as block 50. In Figs. 6 and 7 there is shown a more positive clamp for the 16 or 40 by the use of screws 20′ that enter threaded holes 60 in member 40, and are adjustable by means of slots 62.

Having thus described my invention and the advantages thereof, I do not wish to be limited to the details herein disclosed, otherwise than as set forth in the claims, but what I claim is:

1. A device of the class described comprising a sub-base, ways thereon, a sub-plate slidable in the ways on the sub-base, a second base fixed with respect to the sub-plate, ways on the second base, a second plate slidable in the ways on the second base, said sub-plate and second plate ways being disposed at angles to each other, an anvil secured to the sub-base blocking the ways thereon and a second anvil secured to the second base and blocking the ways thereon, said anvils extending into the paths of the respective plates and positively positioning the plates in predetermined relationship in the respective ways, gauge block devices disposable between each anvil and the respective plate for accurately determining the distance of each plate from its respective anvil in order to accurately locate a piece of work on the second plate with respect to a fixed point, and means removably securing the anvils in position.

2. The apparatus as described in claim 1 including a second anvil for the sub-base and a second anvil for the second base, said anvils being located respectively at the ends of the bases and holding the respective plates in alignment with the ends of the bases.

3. The apparatus as described in claim 1 including a second anvil for the sub-base and a second anvil for the second base, said second anvils being located respectively at the ends of the bases and holding the respective plates in alignment with the ends of the bases, and means removably securing said anvils to allow for sliding motion of the respective plates on their bases.

4. A device of the class described comprising a sub-base, ways on the sub-base, said ways being open from end-to-end thereof, a sub-plate slidable in the ways on the sub-base, a second base fixed with respect to the sub-plate, ways on the second base, said second base ways being open from end-to-end, a second plate slidable in the ways on the second base, said sub-plate and second plate being disposed at right angles to each other, an anvil secured to the sub-base and a second anvil secured to the second base, said anvils extending into the areas of the respective ways and positively positioning the respective plates in predetermined relationship on their bases, and gauge-block devices disposable between each anvil and the respective plate for accurately determining the distance of adjustment of each plate from its respective anvil in order to accurately locate a piece of work on the second plate with respect to a fixed point, means providing for removability of said anvils for selective replacement thereof by an adjustable stop.

5. The apparatus recited in claim 4 wherein said stop comprises a threaded rod attachable to the respective base, a strap threaded on the threaded rod and a threaded stop member threaded with respect to the strap, so that both the strap and the stop are individually adjustable with respect to its base.

References Cited in the file of this patent

UNITED STATES PATENTS

| | | |
|---|---|---|
| 1,217,572 | Craley | Feb. 27, 1917 |
| 2,475,263 | Staggs | July 5, 1949 |